UNITED STATES PATENT OFFICE.

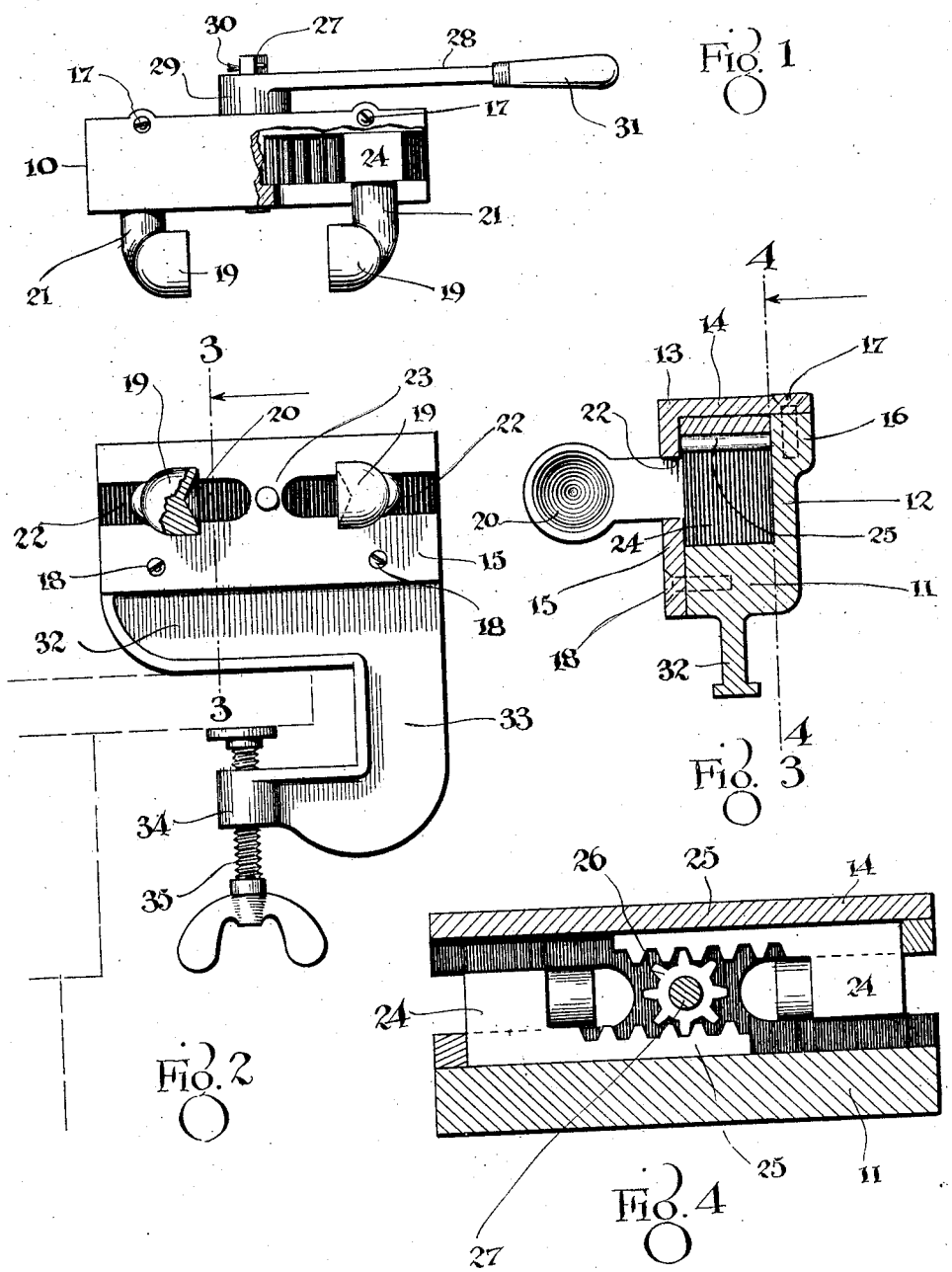

HARRY C. ATWOOD, OF ARDMORE, OKLAHOMA.

HAND-NUTCRACKER.

1,391,751.

Specification of Letters Patent. Patented Sept. 27, 1921.

Application filed July 10, 1920. Serial No. 395,241.

*To all whom it may concern:*

Be it known that I, HARRY C. ATWOOD, a citizen of the United States, and a resident of Ardmore, in the county of Carter and State of Oklahoma, have invented certain new and useful Improvements in Hand-Nutcrackers, of which the following is a specification.

This invention has reference to improved and simple nut crackers adapted primarily to be operated by hand, for the purpose of cracking nuts of various sorts, and especially pecans, for the purpose of obtaining the meats thereof substantially whole and without mashing or destroying the same.

The invention also comprehends a nut cracker of the class described which is of novel and simple construction, and which is provided with improved means whereby pressure can be easily applied with sufficient power to crack various kinds of small nuts quickly and without breaking the same up into small parts, the device also being provided with means whereby it may be detachably mounted on the edge of a table or the like when used, and embodying jaws of novel formation guided in a casing and provided with rack and pinion operated means for moving the same to cracking and releasing positions.

Other and further objects of my invention will become readily apparent to persons skilled in the art from a consideration of the following description, when taken in conjunction with the accompanying drawings, wherein:

Figure 1 is a plan view partly in section, of my improved hand nut cracker,

Fig. 2 is a front elevation of the device shown in Fig. 1 and with one of the cracking jaws in section.

Fig. 3 is a sectional view taken on the line 3—3 of Fig. 2, and

Fig. 4 is a sectional view taken on the line 4—4 of Fig. 3, the parts being enlarged with respect to Figs. 1 and 2.

As shown, the improved nut cracker comprises a casing 10 including a bottom or base portion 11 which is relatively thick and provided at one side with a wall 12 extending vertically from the horizontal base 11. The casing is of rectangular outline, and thus a chamber or guideway is formed by the base and side wall 12, in conjunction with a right angular wall 13 forming the top portion 14 and the opposite side 15 at the front of the casing. The top portion is secured to the side wall 12 through the medium of socketed enlargements 16 formed at the upper edge of the latter, screws 17 passing through apertured ears in the top wall and engaging said sockets for this purpose. Of course, the sockets are screw threaded, and similar sockets are formed horizontally in the base 11 of the open side, for securing the side wall 15 in position, through the medium of screws or the like 18, thus detachably connecting the parts so that they may be readily assembled or disassembled.

The cracking jaws are designated at 19 and are preferably of circular contour or cross section and provided with concavities 20 at their opposed jaw faces which are made conical to receive the pointed ends of the nuts therein. These jaws are extended toward each other in parallel relation to the casing and at right angles to the shank portions 21 which extend through a longitudinal guide slot 22 in the side wall of the casing opposed to the wall 12 and preferably formed by the angular plate 13 and the side 15, the edges of which may be spaced apart or formed with an intermediate web portion 23 serving as a connection therebetween, with the slots extending to the opposite ends of the casing.

The inner ends of the shank portions 21 are provided with right angularly extending enlargements 24 slidably mounted in the guideway or casing and provided with a toothed rack bar 25 extending inwardly. The rack bar of one jaw is disposed at the top of the casing and the rack bar of the other jaw is disposed at the bottom of the casing, so that the feet thereof oppose each other for engagement with a pinion or spur gear 26 which is rotatably mounted therebetween on a pintle or shaft 27 journaled transversely through the casing and held from displacement as by fixing the pinion to the shaft within the casing.

Thus, it will appear that by rotating the pinion in opposite directions the jaws 19 may be moved toward and away from each other and for this purpose, an operating handle or the like 28 is provided, the same having a sleeve or hub 29 engaged on the flared portion of the shaft or pintle 27 and held thereon by a cotter pin or the like 30 in order that the lever may be readily detached. Thus by gripping the handle 31 of the lever and moving the same forwardly, the jaws may be brought together to clamp and crack the nut held therebetween, while reverse operation of the lever will result in separation of the jaws and releasing of the nut.

It is to be understood that the jaw extensions will operate freely in the channel or chamber formed within the casing and will be properly guided into alinement. When the jaws are separated, the nut, such as a pecan, is placed with its pointed ends engaging the concavities or sockets of the jaws, when the lever is moved forward to bring the jaws together, thus cracking the nut. Opposite movement of the lever will separate the jaws and release the nut, and by reason of the construction devised, the operation may be quickly carried out with the minimum application of force or pressure, without injury to the operating parts. For convenience, means to detachably support the device in position for use is provided, and as shown, the base 11 is provided with a depending web extension 32 forming part of the U-shaped jaw member 33 which is provided with an internally threaded vertical sleeve 34 receiving a thumb screw 35 for attaching the device to a table or other suitable place for operation and permitting it to be removed and stored away when not in use.

However, in practice, it may be stated that the end portions, which serve to limit the reciprocation or outward movement of the rack bars 25 by engagement with the enlargements 24, are preferably formed with the back part or side wall 12, thus preventing displacement of the rack bars. In addition, it should be noted that the enlargements 24 of the rack bars are spaced from the opposite walls with respect to the positions of the rack bars thereof, thus permitting the jaws 19 to be moved toward each other and to come in contact instead of being stopped or limited in their movements by the enlargements 24 coming in contact with the inner ends of said rack bars. By this means, the jaws are allowed sufficient movement to come sufficiently close together to crack small-sized nuts, thus permitting the cracking jaws 19 to come in actual contact with each other and obviate the objection to devices of this character as heretofore constructed.

In view of the foregoing, it is thought that the operation of the device will be readily understood and in view of the simplicity and practical value that it will commend itself to those skilled in the art.

Having thus described my invention, what I claim is:—

1. A hand nut cracker comprising a hollow casing having spaced horizontally alined slots at one side, coöperating opposed recessed jaws having shank portions extending transversely horizontally through the slots of the casing and prolonged longitudinally therein, and means at the other side of the casing and operatively engaged with said shank portions within the casing for simultaneously moving the jaws in opposite directions for cracking or releasing a nut.

2. A nut cracker comprising a slotted rectangular casing, opposed jaws extending parallel to the casing and having conical concavities therein, said jaws having shank portions extending through the slot and provided with enlargements snugly guided in the channel formed in the casing, one of said enlargements having its top edge provided with a relatively flat extension formed into a rack bar and the bottom edge of the other enlargement having a corresponding extension, a shaft journaled through the casing, a pinion fixed to the shaft within the casing and engaging said rack bars, a lever detachably fixed to the shaft, and means for supporting the device in position.

3. A hand nut cracker comprising a casing including a base portion provided with a web extension having formed therewith a U-shaped jaw, a thumb screw operating through said jaw, said base portion having a side wall at one side and having the opposite side open, an angular wall forming a top portion and the opposite side detachably secured to said base portion and said side wall at the exposed edges of the latter and forming a channel within the casing having slots at one side open at the ends of the casing, jaws having concaved engaging faces opposing each other and reduced shank portions extending at right angles therefrom through the slots for reciprocation therein in opposite directions, said shank portion having extensions arranged parallel to the jaws and at right angles to the shank portions for movement within the channel, and a handle exteriorly of the casing and rotatably carried thereby in operative connection with the extensions for actuating the jaws in opposite directions upon oscillation of the handle.

HARRY C. ATWOOD.